Sept. 4, 1928.
W. DUBILIER
1,683,067
GRID LEAK RESISTANCE
Filed May 24, 1924
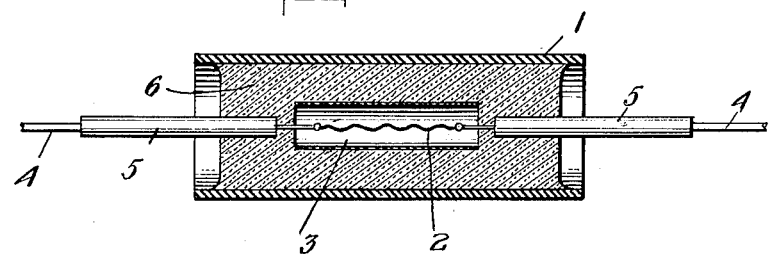
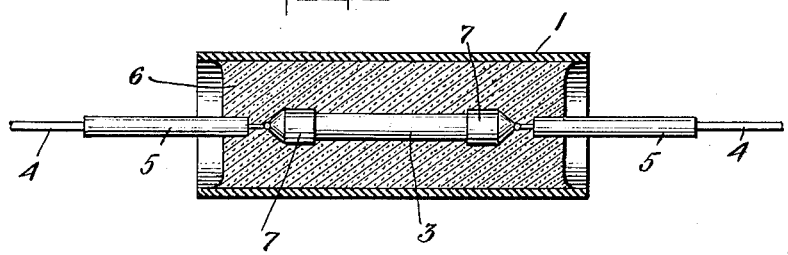
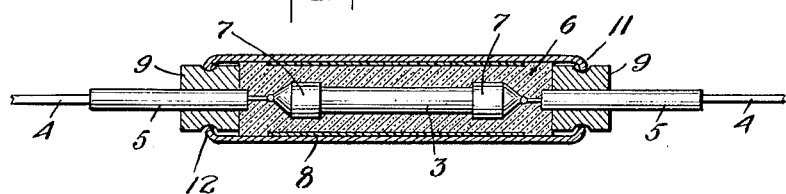
INVENTOR
WILLIAM DUBILIER
BY
ATTORNEY Patented Sept. 4, 1928.

1,683,067

UNITED STATES PATENT OFFICE.

WILLIAM DUBILIER, OF NEW YORK, N. Y., ASSIGNOR TO DUBILIER CONDENSER CORPORATION, A CORPORATION OF DELAWARE.

GRID-LEAK RESISTANCE.

Application filed May 24, 1924. Serial No. 715,657.

This invention relates to improvements in electrical resistances; particularly electrical resistances of large value intended chiefly for use in signalling by radio, and commonly known as grid leak resistances.

An object of the invention is to provide a grid leak resistance which is simple, of small compass, so that it can easily and conveniently be handled or mounted, and durable and efficient in construction and operation, with the principal parts thereof securely enclosed and amply protected against damage or injury.

Other objects and advantages of this invention are set forth in the following description; but it is to be understood that I reserve the right to make changes which are not necessarily illustrated herein but which, nevertheless, are embraced within the spirit and scope of the invention, as defined by the broad and general meanings of the terms in which the claims appended hereto are expressed.

On the drawings,

Figure 1 is a longitudinal sectional view of a grid leak according to my invention;

Figure 2 is a similar view of a modification; and

Figure 3 is a similar view of a further modification.

On the drawings, the same numerals identify the same parts throughout.

Referring first to Figure 1, I show at 1 an outer casing which may have the form of a section of tubing open at both ends, and enclosed by this casing is a resistance element 2 which may be a strip of almost any well-known material now employed for the purpose, this strip being of low conductivity so that while it does not obstruct the passage of current altogether, it, nevertheless, offers very high resistance thereto. The element 2 is disposed in a sleeve or covering 3 which may be a short length of tubing made of fiber, glass or some other insulating material, or may even be a wrapping of paper or the like, wound around the element 2. Of course the sleeve 3 can have closed ends and the element 2 can be supported therein, so as to be out of contact with the inside surface of the sleeve if desired, and through the ends of the sleeve 3 project conductors 4, each of which is attached to one end of the element 2, so that the resistance can be connected into circuit. The conductors 4 may be covered with insulation such as rubber 5 which completely encloses these conductors, except the extremities which project through the ends of the sleeve 3 to be united to the extremities of the element 2. The casing 1 is preferably longer than the sleeve 3 so that it projects beyond the sleeve at both extremities, and this casing may be filled with wax or some other insulating or sealing compound 6, so as to embed the sleeve 3 as well as the ends of the conductors 4 and insulation 5. The sleeve 3 and the conductors or wires 4 will, of course, be situated at the center of the casing 1, and the wax will maintain the casing, the sleeve and the conductors in assembled relation. This casing 1 and the wax which fills it and surrounds the sleeve 3 and conductors 4, make a protective covering or shell for the principal parts of the grid leak, such as the element 2, the sleeve 3 and the conductors 4, effectually preserving the element 2 and the sleeve 3, as well as the connections of the element 2 with the conductors 4 against the action of moisture or injury or impairment, due to rough handling. The grid leak is therefore made very durable in construction; the possibility of its ever sustaining damage is reduced to a minimum and at the same time, the size is not increased to such a point as to make it difficult to mount or handle.

In the form of Figure 2, I show a similar casing 1, which houses a grid leak of the ordinary construction, comprising a sleeve 3 containing a resistance element 2 joined at its ends to metal caps 7 affixed to the extremities of the sleeve 3 and upon the outside of the latter. The conductors 4 are connected to these metal caps or terminals 7 and are covered with insulation 5 as before, and the casing 1 is filled with wax or the like to embed the sleeve 3 and with the casing 1 form an outside covering or protective shell the same as in connection with the grid leak described above and illustrated in Figure 1.

Figure 3 shows another form in which the resistance element 2 is contained in a sleeve 3 having metal caps constituting terminals at its opposite ends, the sleeve 3 and caps 7 being embedded in wax as before, and around this wax is placed a wrapping of insulation such as mica 8. Against the ends of the wax 6 are placed bushings 9 of some insulating material such as bakelite through which the insulated conductors 4 pass, to be soldered or otherwise joined to the terminals 7, and upon the outside of the entire device is a piece of tubing 10 forming a casing like the casings 1 above mentioned. The extremities 11 of this piece of tubing 10 are spun over into grooves 12 of the bushings 9 and thus the bushings are held tightly against the extremities of the insulation 6.

In all forms of my invention as described above, the grid leak is rendered absolutely moisture-proof, and the mechanical strength is increased to a very great degree, thereby rendering the grid leak resistance more durable, and maintaining the operative efficiency without, however, materially increasing the size or making the grid leak more difficult to handle.

Having described my invention, what I believe to be new and desire to secure and protect by Letters Patent of the United States, is:—

1. The combination of an electrical resistance element, a sleeve containing said element, a protective shell for said sleeve and said element, and conductors joined to the extremities of said element and projecting through the ends of said shell, said shell comprising a substance in which said sleeve, and the extremities of said conductors are embedded and sealed, said sleeve being spaced apart from the resistance element.

2. The combination of a resistance element, a sleeve therefor, conducting members joined to the opposite ends of said element and serving as the sole support for same, a substance in which the sleeve containing said element and the ends of the conducting members are imbedded and sealed, and a casing enclosing said substance and said sleeve with the resistance element therein.

3. The combination of a resistance element, a sleeve containing said element, insulated conductors having their extremities projecting into the sleeve and connected to the resistance element therein, a substance covering the sleeve and the adjacent ends of the conductors and embedding and sealing the same, said sleeve being spaced apart from the resistance element, and a casing enclosing said substance.

4. The combination of a resistance element, a sleeve containing said element, said sleeve having terminal caps, conductors having their extremities connected to said caps, a substance covering said sleeve and said caps and the adjacent extremities of said conductors and embedding and sealing same, said sleeve being spaced apart from the resistance element, and a casing enveloping said substance.

5. The combination of a resistance element, a sleeve containing said element, terminal caps at the ends of said sleeve, conductors joined at their ends to said caps, a substance covering said sleeve and said caps and the adjacent ends of the conductors and embedding and sealing the same, said sleeve being spaced apart from the resistance element, an insulating wrapping for said substance, bushings abutting the ends of said substance and giving passage to said conductors, and a casing enveloping said substance and said wrapping and engaging at its extremities with said bushings to hold said bushings in place.

6. In a grid leak, the combination of a high resistance element supported solely at its ends, a sleeve surrounding said element, terminal caps at the ends of said sleeve, conductors joined at their ends to said caps, a non-hygroscopic substance surrounding said sleeve and said caps and the adjacent ends of the conductors imbedding and sealing the same, said substance being spaced apart from the resistance element, an insulating wrapping for said substance, bushings abutting the ends of said substance and giving passage to said conductors, and a casing involving said substance and said wrapping and engaging at its extremities with said bushings to hold the bushings in place.

In testimony whereof I affix my signature.

WILLIAM DUBILIER.